Patented Oct. 28, 1947

2,429,859

UNITED STATES PATENT OFFICE 2,429,859

SULFUR-FORMALDEHYDE RESINS

Joseph Frederic Walker, Lewiston, N. Y., assignor to E. I. du Pont de Nemours & Company, Wilmington, Del., a corporation of Delaware No Drawing. Application January 16, 1945, Serial No. 573,135

10 Claims. (Cl. 260—67)

This application is a continuation-in-part of my copending application Serial No. 478,839, filed March 11, 1943.

This invention relates to the manufacture of sulfur-containing resins, more particularly resins having rubber-like properties prepared by reacting formaldehyde with an alkali polysulfide solution. Resins of this character are already known in the art and are characterized as sulfur-formaldehyde resins. They are ordinarily prepared by reacting an aqueous solution of formaldehyde with a sodium polysulfide solution, the latter being frequently prepared by dissolving sulfur in an alkali. However, the methods now available give only low and variable yields of resin, depending on the particular method employed for the preparation of the sulfur solution. Also, they result in resins having variable characteristics. Usually these resins have less than 90% sulfur content, and are often brittle and non-rubbery or become so on storage.

I have now found that the yields of sulfur-formaldehyde resins, prepared by reacting aqueous formaldehyde solutions with alkali polysulfide solutions, preferably sodium polysulfide, can be greatly increased by the addition of an acidic material to the reaction mixture during the reaction. In this way high yields of resins of rubbery character are secured, as contrasted with the relatively low yields of brittle, non-rubbery resins secured when utilizing other procedures now available for preparing resins of this type.

One of the objects of this invention is to improve the process of reacting an aqueous solution of formaldehyde and an alkali polysulfide solution to secure pliable rubber-like resins by carrying out the reaction under such conditions that the yield of the desired product is greatly superior to that obtainable by utilizing other methods now available for securing the sulfur-formaldehyde resins. Another object of this invention is to carry out the reaction between an alkali polysulfide solution, preferably sodium polysulfide, and formaldehyde under such circumstances that an acidic material is passed into the reaction mixture during the reaction, whereby the yield of the desired elastic resin is greatly increased. These and still other objects of my invention will be apparent from the ensuing disclosure of certain preferred embodiments thereof.

The pliable rubber-like resins which it is an object of this invention to produce in high yields, yields at least 3 to 5 times greater than those obtainable by the use of previously described methods, are characterized by a sulfur content ranging from 85 to 93%. Certain prior workers in this field have reported the preparation of resins by reacting alkali polysulfide solutions with formaldehyde. In utilizing the process described in one of these earlier reports, I have obtained only small yields of rubber-like resins which resins, while possessing elastic properties as first obtained, quickly became brittle and lost their elastic characteristics. Their sulfur content in all cases was below 85%. Moreover, while the yields were low when the reactants were heated, at room temperature the resin was precipitated even more slowly, in all cases low yields being secured.

When utilizing the method of another prior worker in this field, a method involving the reaction of 3 moles of formaldehyde with 1 mole of sodium tetrasulfide in water solution, I have obtained only very low yields of a brittle resin. This resin contained about 79.6% sulfur, an amount much lower than the minimum value for the sulfur content of resins produced by utilizing my improved procedure. In general, in utilizing the methods now available, I have secured yields less than 1 gram per gram of formaldehyde.

It has now been discovered that increased yields of pliable resins may be obtained by reacting an alkaline polysulfide with formaldehyde or a formaldehyde polymer of the polyoxymethylene type if an acid material of the type set forth below is gradually added to the reaction mixture during the course of the reaction.

Suitable acid materials include inorganic acids, organic acids, acid anhydrides, and acid salts of alkali metals or alkaline earth metals, which are more acidic than hydrogen sulfide, i. e., which have an ionization constant greater than that of hydrogen sulfide. Best results have been obtained with acid materials which are only slightly more acid than hydrogen sulfide. The preferred material is carbon dioxide; however, excellent results have also been obtained with sulfur dioxide and sulfuric acid.

The acid material is preferably added in an amount approximately the chemical equivalent of the alkaline polysulfide; however, greatly improved yields are obtained when the acid material is added to the extent of between 0.5 and 1 equivalent per alkaline polysulfide equivalent. By one equivalent of acid per equivalent of alkaline polysulfide, is meant, for example, one mol of hydrogen chloride or ½ mole of carbonic acid, or carbon dioxide, for each ½ mole of sodium polysulfide ($Na_2S_n$).

The acid material is gradually added during the course of the reaction, i. e., over a period of 2 hours to 24 hours. The acidic material takes part in the reaction to form the alkali metal or alkaline earth metal salt of the acid material, thus forcing the reaction to completion so that a high yield of methylene polysulfide is obtained. This is indicated in the following equation in which HX designates an acidic material:

$$Na_2S_n + CH_2O + 2HX = 2NaX + CH_2S_n + H_2O$$

The reaction is carried out at a temperature between 20° C. and 40° C. Under such conditions it is possible to secure 3 to 5 grams of a resin having a rubber-like texture and resiliency per gram of formaldehyde used. As contrasted with these yields, and when no acidic material is employed, I have found that the yields range from only 0.6 gram to 1.0 gram of resin per gram of formaldehyde used.

As the resins normally contain 90 to 93% sulfur and correspond to the polymers $(CH_2S_4)_x$, or $(CH_2S_5)_x$, or mixtures thereof, I believe that the overall reactions occurring when using $CO_2$ as the acidic material (depending upon the sulfide present) may be represented as follows:

$$Na_2S_4 + CH_2O + CO_2 = 1/x(CH_2S_4)_x + Na_2CO_3$$
$$Na_2S_5 + CH_2O + CO_2 = 1/x(CH_2S_5)_x + Na_2CO_3$$

In accordance with these equations the theoretical yield would correspond to 4.74 grams of the resin per gram of formaldehyde for the equation involving $Na_2S_4$ and 5.81 for the equation involving $Na_2S_5$.

When an excess of formaldehyde is present the yield is not improved and considerable unreacted formaldehyde remains in the reaction mixture. At temperatures in excess of 40° C. the desired reaction product is not secured, but instead there is secured only resins of low sulfur content which quickly lose their elasticity and become brittle.

The resin is usually precipitated in massive form, but may also be secured in the form of a dispersion if a dispersing agent is added to the reaction mixture and a ripening interval of from 15 to 20 hours is maintained before addition of the acidic material. To produce such dispersed resins I have utilized magnesium hydroxide and soap as dispersing agents with considerable success. Other suitable dispersing agents can also be used.

The polysulfides which may be employed in accordance with my improved process include those of the alkali metal and alkaline earth metals. In the case of the latter, however, it should be noted that some acids will precipitate alkali metal salts with the resin, thus contaminating it. For this reason, when utilizing calcium polysulfide, carbon dioxide and sulfuric acid are generally unsatisfactory acidifying agents.

The formaldehyde necessary may be employed in the form of its aqueous solution. The methanol present in most commercial solutions of formaldehyde does not interfere with the resin reaction. I have also observed that linear formaldehyde polymers of the polyoxymethylene type such as paraformaldehyde and alpha polyoxymethylene may be employed. However, derivatives of formaldehyde such as hexamethylenetetramine and dimethylol urea are not satisfactory since they do not yield the desired rubber-like product. I have generically termed the compounds which may be reacted with alkaline polysulfides to form the improved elastic sulfur-formaldehyde resins as reactive methylene bodies, this term thus including formaldehyde, paraformaldehyde and alpha polyoxymethylene.

The sulfur-formaldehyde resins prepared in accordance with my improved process are pliable resins, having a rubber-like resiliency which, on analysis, are shown to contain from 85 to 93% sulfur. When secured in the form of a dispersed resin, the resins are in the form of a white or yellow paste, or a dry yellow powder. On heating with water or preferably with dilute acid, these dispersed forms coagulated to give the elastic resin. They are composed of carbon, hydrogen and sulfur and are substantially free of oxygen or other elements. In color they are generally yellow or olive green. In massive form these resins possess elastic properties and on heating soften but do not melt when heated at 120 to 140° C. While soluble in carbon bisulfide, they are fairly insoluble at room temperature in other usual solvents.

As previously stated, I have found that the resins of the prior art containing less than 85% sulfur generally harden and become brittle on storage at ordinary temperatures. This behavior is to be sharply contrasted with the permanent resiliency of the higher sulfur content resins prepared in accordance with my invention.

The new products prepared in accordance with my improved procedure may be compounded with carbon black, factice or other ingredients, and may be vulcanized with lead oxide and other agents. There may be thus produced rubber-like compositions possessing a high resistance to organic solvents, fair strength and dielectric properties, and satisfactory elasticity. Such resins are of value generally as a substitute for rubber in the manufacture of articles of all types.

I have also observed that the sulfur-formaldehyde resins possess excellent plasticizing action for sulfur. Thus, a permanently plastic sulfur may be secured by dissolving from 25 to 30% of the resin in molten sulfur. Plasticized sulfur containing 30% of the resin is a stiff putty-like plastic at room temperature. At 80 to 85° C. it becomes sticky, and flows freely at a temperature of 90 to 95° C. While plastic at −15° C., it cracks at −20° C.

As examples of my improved method for the manufacture of sulfur-formaldehyde resins containing from 85 to 93% sulfur and possessing permanent elasticity, the following may be given.

*Example I*

A solution of sodium hydroxide prepared by dissolving 126.6 gms. (3 moles) of U. S. P. sodium hydroxide in 450 cc. of water was heated with 160 gms. (5 moles) of sulfur until a solution was obtained. This solution was then cooled to 30° C. and 81 cc. of 37% formaldehyde solution was added. After agitating this solution at room temperature for one hour, carbon dioxide gas was passed in with agitation until the precipitation of resin was complete. A yield of 130 gms. of rubber-like resin was obtained and was washed with hot water, then with 10% acetic acid and finally with water. This product contained approximately 5% water. After drying, it was found to contain 89.1% sulfur by analysis (theory for $(CH_2S_4)_n$ is 90.1%). The yield of resin is equivalent to 4.1 gms. per gram of formaldehyde charged or approximately 87% of the theoretical yield as indicated by the following equations:

$$3NaOH + 5S = Na_2S_4 + \tfrac{1}{2}Na_2S_2O_3 + 1\tfrac{1}{2}H_2O$$
$$Na_2S_4 + CH_2O + CO_2 = 1/n(CH_2S_4)_n + Na_2CO_3$$

Example II

An alkali sulfide solution was prepared by dissolving 192 gms. sulfur (6 moles) in a solution of 126.6 gms. of U. S. P. sodium hydroxide (3 moles) in 450 cc. distilled water. After cooling this solution to 25° C., 81.0 gms. of 37% formaldehyde (1 mole) were added and after one hour carbon dioxide was passed into the mixture with agitation for 8 hours. The precipitated rubber-like resin was washed with hot water, then with 10% acetic acid and finally with hot water. The moist resin containing approximately 6% water, weighed 160 gms. On drying it was found to have a sulfur content of 92.3% (theoretical sulfur content for $(CH_2S_5)_n$ is 92.6%). This yield is equivalent to 5 gms. resin per gm. formaldehyde ($CH_2O$) and comes to approximately 86% of the theoretical yield as indicated by the following equations:

$$3NaOH + 6S = Na_2S_5 + \tfrac{1}{2}Na_2S_2O_3 + 1\tfrac{1}{2}H_2O$$

$$Na_2S_5 + CH_2O + CO_2 = 1/n(CH_2S_5)_n + Na_2CO_3$$

Example III

A charge of 12.8 kgms. of sulfur (400 moles) was agitated with 34% sodium hydroxide solution containing 8.4 kgms. of 95% caustic soda (200 moles NaOH), the mixture being heated to about 100° C. until the greater part of the sulfur had dissolved. After cooling to 30° C. 1.1 kgms. of undissolved sulfur was removed by filtration and 8.1 kgms. of 37% formaldehyde (100 moles $CH_2O$) was added. After agitating for about 2 hours, carbon dioxide gas was passed into the mixture and the agitation continued for approximately 24 hours. At the end of this period the precipitated resin was removed. After standing for 2 days additional amounts of resin were removed. The product was then combined, washed with hot water in a kneading machine and dried under partial vacuum in the same machine. The dried product weighed 9.64 kgms. and contained 91.0% sulfur. The yield in grams per gram of formaldehyde utilized was 3.21.

Example IV

An alkali polysulfide solution was prepared by dissolving 168.4 grams of 95% sodium hydroxide (4 moles) and 256 grams of sulfur (8 moles) in 600 cubic centimeters of boiling water. The solution was then cooled to 35° C. and 162 grams of 37% U. S. P. formaldehyde (2 moles of $CH_2O$) was added. The formaldehyde solution contained 8% of methanol. After 1 hour carbon dioxide was passed into the reaction mixture which was maintained at room temperature, and the gas was continuously passed in while the reaction mixture was subjected to agitation for approximately 6 to 8 hours. After 24 hours the pliable resins which had precipitated were removed. Upon washing with hot water and drying, the yield of resin was found to be 220 grams, or 3.7 grams per gram of formaldehyde utilized.

Example V

Eight moles (256 g.) of sulfur were dissolved in a hot solution of four moles (160 g.) of sodium hydroxide in 600 cc. of water. After cooling this solution to 30° C., a solution of 11 grams of sodium hydroxide in 50 cc. water and a solution of 24.4 grams magnesium chloride hydrate ($MgCl_2 \cdot 6H_2O$) were successively added. To the resultant reaction mixture, 162 grams 37% formaldehyde (2 moles $CH_2O$) were then added. After approximately 24 hours the reaction mixture became slightly cloudy but showed no precipitation. At At this point carbon dioxide gas was passed in with agitation and a fine yellow precipitate separated, which was then washed by decantation with water and filtered. The wet product thus obtained weighed 230 grams and contained approximately 65% formaldehyde-sulfur resin. A sample on drying was isolated in the form of a free-flowing yellow powder containing 90.6% sulfur. On heating, alone or in the presence of dilute acid, the powder agglomerated forming a rubber-like resin. Approximately 2.5 grams of dry dispersed resin were produced per gram of formaldehyde.

Example VI

Two grams of soap dissolved in 100 cc. of water were added to 346 grams of alkali-sulfur solution prepared by heating 84 grams 95% sodium hydroxide and 256 grams of sulfur with water. To this solution was added at room temperature, 81 grams 37% formaldehyde (1 mole $CH_2O$), after which it was allowed to stand overnight. Carbon dioxide gas was then passed through the mixture for four hours at room temperature. The dispersed precipitate thus obtained was coagulated with hot dilute acid giving a pliable resin. The yield of resin was 76 grams, or 2.5 grams per gram of $CH_2O$.

Example VII

A sodium tetrasulfide solution was prepared by dissolving two moles (480 g.) of sodium sulfide hydrate ($Na_2S \cdot 9H_2O$) in 150 cc. distilled water and heating this solution with 192 grams (6 moles) of sulfur until a clear solution was obtained. To this solution, 162 grams of 37% formaldehyde (2 moles) were added at 28° C. After ½ hour standing, carbon dioxide gas was passed into the mixture from which a total of 174 grams of pliable resin were precipitated on standing over-night. This is equivalent to 2.9 grams resin per gram of formaldehyde ($CH_2O$). This resin contained approximately 87% sulfur.

Example VIII

An alkali-sulfur solution was prepared by dissolving 256 grams (8 moles) sulfur in hot caustic made up from 168 grams 95% sodium hydroxide (4 moles NaOH) and 600 cc. water. After cooling this solution to 30° C., 162 grams 37% formaldehyde was gradually dropped into the agitated mixture, while sulfur dioxide gas was passed in at the same time. A yield of 147 grams of pliable yellow resin containing 90.4% sulfur was obtained. This amounts to approximately 2.5 grams resin per gram of formaldehyde.

Example IX

An alkali-sulfur solution prepared by dissolving 168 grams 95% sodium hydroxide (4 moles NaOH) in 600 cc. of water and heating with 8 moles (256 g.) sulfur, was cooled to room temperature, and 162 grams of 37% formaldehyde (2 moles $CH_2O$) were added. After 30 minutes standing, 20% sulfuric acid was gradually dropped (over a period of 4 to 5 hours) into the reaction mixture with agitation until one mole of sulfuric acid had been added. A total of 175 grams of soft resin was removed after approximately 24 hours, or 2.9 grams resin per gram of $CH_2O$.

Example X

To an alkali-sulfur solution obtained by dissolving 168 grams (4 moles) of 95% sodium hydroxide and 256 grams (8 moles) sulfur in 600 cc. distilled water, 162 grams of 37% formaldehyde (2 moles $CH_2O$) was added gradually at 90°

C. and carbon dioxide was passed into the mixture with agitation. A yield of 82 grams of pliable resin was obtained. The resin hardened to a brittle solid on standing at room temperature. The resin contained 82.6% sulfur. The yield per gram $CH_2O$ was 1.37.

The low yield illustrates the adverse effect of heating (to a temperature of 90° C.) when utilizing my improved method involving the addition of an acidic agent.

Example XI

An alkali-sulfur solution was prepared by dissolving 84 grams (2 moles) 95% caustic soda and 128 grams (4 moles) of sulfur in 300 cc. water, the resulting solution being then cooled to room temperature. Three moles of formaldehyde were then added in the form of 243 grams 37% solution. After standing about 30 minutes at room temperature, 80 cc. or 13% of the total mixture was removed and allowed to stand at room temperature for a further period of 24 hours. Carbon dioxide was then passed into the remaining 87% until it was saturated. After 24 hours, a yield of 75.5 grams of pliable resin, or 0.97 gram per gram $CH_2O$, was obtained from the solution which had been treated with carbon dioxide. The untreated solution contained 7.7 grams of resin (0.64 gram per gram $CH_2O$). The filtrate from these solutions smelled strongly of unreacted formaldehyde.

This example illustrates that the use of excess formaldehyde has no effect in improving the yield.

It will be readily apparent that various modifications may be made in the preferred procedure which has been described above as illustrative of my invention. Accordingly, it is my intention that the invention be not restricted to those details set forth as illustrative of preferred embodiments thereof, but that its scope be construed in accordance with the appended claims.

I claim:

1. The method of producing a pliable resin having a rubber-like resiliency which comprises reacting, in an aqueous medium, an alkali metal polysulfide with a reactive methylene body taken from the group consisting of formaldehyde, paraformaldehyde and alpha polyoxymethylene at a temperature between 20° C. and 40° C., and gradually adding to said reaction mixture, during the course of the reaction, between 0.5 and 1.0 equivalent per equivalent of polysulfide of a substance taken from the group consisting of carbon dioxide, sulfur dioxide and sulfuric acid.

2. The method of producing a pliable resin having a rubber-like resiliency which comprises reacting, in an aqueous medium, a sodium polysulfide with a reactive methylene body taken from the group consisting of formaldehyde, paraformaldehyde and alpha polyoxymethylene at a temperature between 20° C. and 40° C. and gradually adding to said reaction mixture, during the course of the reaction, between 0.5 and 1.0 equivalent per equivalent of polysulfide of a substance taken from the group consisting of carbon dioxide, sulfur dioxide and sulfuric acid.

3. The method of producing a pliable resin having a rubber-like resiliency which comprises reacting, in an aqueous medium, sodium tetrasulfide with a reactive methylene body taken from the group consisting of formaldehyde, paraformaldehyde and alpha polyoxymethylene at a temperature between 20° C. and 40° C. and gradually adding to said reaction mixture, during the course of the reaction, between 0.5 and 1.0 equivalent per equivalent of polysulfide of a substance taken from the group consisting of carbon dioxide, sulfur dioxide and sulfuric acid.

4. The method of producing a pliable resin having a rubber-like resiliency which comprises reacting, in an aqueous medium, an alkali metal polysulfide with formaldehyde at a temperature between 20° C. and 40° C., and gradually adding to said reaction mixture, during the course of the reaction, between 0.5 and 1.0 equivalent per equivalent of polysulfide of a substance taken from the group consisting of carbon dioxide, sulfur dioxide and sulfuric acid.

5. The method of producing a pliable resin having a rubber-like resiliency which comprises reacting, in an aqueous medium, an alkali metal polysulfide with a reactive methylene body taken from the group consisting of formaldehyde, paraformaldehyde and alpha polyoxymethylene at a temperature between 20° C. and 40° C., and gradually adding to said reaction mixture, during the course of the reaction, between 0.5 and 1.0 equivalent per equivalent of polysulfide of carbon dioxide.

6. The method of producing a pliable resin having a rubber-like resiliency which comprises reacting, in an aqueous medium, an alkali metal polysulfide with a reactive methylene body taken from the group consisting of formaldehyde, paraformaldehyde and alpha polyoxymethylene at a temperature between 20° C. and 40° C., and gradually adding to said reaction mixture, during the course of the reaction, between 0.5 and 1.0 equivalent per equivalent of polysulfide of sulfur dioxide.

7. The method of producing a pliable resin having a rubber-like resiliency which comprises reacting, in an aqueous medium, a sodium polysulfide with a reactive methylene body taken from the group consisting of formaldehyde, paraformaldehyde, and alpha polyoxymethylene at a temperature between 20° C. and 40° C., and gradually adding to said reaction mixture, during the course of the reaction, between 0.5 and 1.0 equivalent per equivalent of polysulfide of carbon dioxide.

8. The method of producing a pliable resin having a rubber-like resiliency which comprises reacting, in an aqueous medium, a sodium polysulfide with a reactive methylene body taken from the group consisting of formaldehyde, paraformaldehyde, and alpha polyoxymethylene at a temperature between 20° C. and 40° C., and gradually adding to said reaction mixture, during the course of the reaction, between 0.5 and 1.0 equivalent per equivalent of polysulfide of sulfur dioxide.

9. The method of producing a pliable resin having a rubber-like resiliency which comprises reacting, in an aqueous medium, a sodium polysulfide with formaldehyde at a temperature between 20° C. and 40° C., and gradually adding to said reaction mixture, during the course of the reaction, between 0.5 and 1.0 equivalent per equivalent of polysulfide of carbon dioxide.

10. The method of producing a pliable resin having a rubber-like resiliency which comprises reacting, in an aqueous medium, a sodium polysulfide with formaldehyde at a temperature between 20° C. and 40° C., and gradually adding to said reaction mixture, during the course of the reaction, between 0.5 and 1.0 equivalent per equivalent of polysulfide of sulfur dioxide.

JOSEPH FREDERIC WALKER.